United States Patent [19]
Guha

[11] Patent Number: 5,897,637
[45] Date of Patent: Apr. 27, 1999

[54] SYSTEM AND METHOD FOR RAPIDLY IDENTIFYING THE EXISTENCE AND LOCATION OF AN ITEM IN A FILE

[75] Inventor: Ramanathan V. Guha, Los Altos, Calif.

[73] Assignee: Apple Computer, Inc., Cupertino, Calif.

[21] Appl. No.: 08/813,344

[22] Filed: Mar. 7, 1997

[51] Int. Cl.$^6$ ................................................. G06F 17/30
[52] U.S. Cl. ........................................ 707/101; 707/100
[58] Field of Search ................................. 707/1, 2, 3, 4, 707/100, 101

[56] References Cited

U.S. PATENT DOCUMENTS

| | | | |
|---|---|---|---|
| 4,996,663 | 2/1991 | Nemes ..................................... | 364/900 |
| 5,301,337 | 4/1994 | Wells et al. .............................. | 395/800 |
| 5,408,652 | 4/1995 | Hayashi et al. ............................ | 707/2 |
| 5,542,087 | 7/1996 | Neimat et al. ........................... | 707/101 |
| 5,542,089 | 7/1996 | Lindsay et al. .......................... | 707/101 |
| 5,615,341 | 3/1997 | Agrawal et al. ......................... | 395/210 |
| 5,724,573 | 3/1998 | Agrawal et al. ............................ | 707/6 |
| 5,742,811 | 4/1998 | Agrawal et al. ............................ | 707/6 |
| 5,754,849 | 5/1998 | Dyer et al. ............................... | 707/101 |

FOREIGN PATENT DOCUMENTS

| | | | |
|---|---|---|---|
| 2 136 612 | 9/1984 | United Kingdom ............ | G06F 15/40 |
| WO 97/22069 | 6/1997 | WIPO .............................. | G06F 17/30 |

OTHER PUBLICATIONS

Tang et al, The Study of LetterOriented Hashing Schemes, Elsevier Science, pp. 157–167, 1995.

Cesarini et al, A Dynamic Hash Method with Signature, ACM Transactions on Database System, vol. 15, No. 2, pp. 309–337, Jun. 1991.

Glassman, S., "A caching relay for the World Wide Web", Computer Networks and ISDN Systems, vol. 27, No. 2, Nov. 1994, pp. 165–173, XP004037987.

Pfeifer, U., et al, "Searching Structured Documents with the Enhanced Retrieval Functionality of FreeWAIS–sf and Sfgate", Computer network and ISDN Systems, vol. 27, No. 6, Apr. 1995, pp. 1027–1036, XP004013204.

PCT International Search Report, for app. No. PCT/US 98/04416, Jun. 25, 1998.

Anonymous, "Mechanism for High–Speed Reference and Re–Hashing", IBM Technical Disclosure Bulletin, vol. 32, No. 5B, Oct. 1989, New York, pp. 483–484, XP000049226.

Anonymous, "Indexing Method Employing Hashing", IBM Technical Disclosure Bulletin, vol. 16, No. 3, Aug. 1973, New York, pp. 694–697, XP002068096.

*Primary Examiner*—Thomas G. Black
*Assistant Examiner*—Frantz Coby
*Attorney, Agent, or Firm*—Fenwick & West LLP

[57] ABSTRACT

A system and method for rapidly identifying the existence and location of an item in a file using an improved hash table architecture. A hash table is constructed having a plurality of hash buckets, each identified by a primary hash key. Each hash entry in each hash bucket contains a pointer to a record in a master file, as well as a secondary hash key independent of the primary hash key. A search for a particular item is performed by identifying the appropriate hash bucket by obtaining a primary hash key for the search term. Individual hash entries within the hash bucket are checked for matches by comparing the stored secondary keys with the secondary key for the search term. Potentially matching records can be identified or ruled out without necessitating repeated reads of the master file. The improved hash table system and method is employed in a contextual text searching application for determining the intersection of a text search with a hierarchical categorization scheme.

16 Claims, 6 Drawing Sheets

SYSTEM AND METHOD FOR RAPIDLY IDENTIFYING THE EXISTENCE AND LOCATION OF AN ITEM IN A FILE

BACKGROUND OF THE INVENTION

1. Field of the Invention

The present invention relates generally to data storage and retrieval techniques, and more particularly to a system and method for rapidly identifying the existence and location of an item in a file.

2. Description of Background Art

In many computer-related applications, it is useful to rapidly identify whether or not a particular item exists in a stored file, database, or table. For example, one such application involves an implementation of a content directory of World Wide Web sites, including listings of Uniform Resource Locators (URLs) identifying on-line documents. It may be useful for a user or automated software application to identify whether or not a particular URL is listed in a particular content directory. Mechanisms for searching multiple pieces of text-based information in a document space such as the World Wide Web often take one of two types. The first type of search mechanism involves providing a text string to a search engine, which then retrieves a descriptor or identifier for any document containing the specified text string. Various combinations of text-strings and Boolean operators may be provided to implement more complex searches. However, the literal nature of such text-based searches often results in retrieval of documents that are unrelated to the intended meaning or context of the search terms. For example, a search for information on lions using the word "lion" as a search term may result in retrieval of documents describing the motion picture "The Lion King", community service clubs such as "Lion's Club", and other documents unrelated to the intended object of the search.

The second type of search mechanism is a category search, which employs a category directory describing a hierarchy of information categories. The search is performed by traversing the hierarchy to successively narrower categories until the desired set of documents is reached. Therefore, a search for information on lions might begin with a broad category of "science", then proceed down the hierarchy to "biology", "zoology", "mammals", and so forth. This approach tends to lessen or eliminate the above-described problem endemic to literal text-based searches. However, if one desires to search for information on lions within the subcategory "science/biology/zoology/mammals", and if no explicit "lions" subcategory exists, one must manually search through all document titles under that subcategory looking for documents related to lions.

What is needed is a mechanism for rapidly determining, for each result of a text-based search, whether the indicated result is listed in a particular category directory representing a desired subject area.

Alternatively, there may be other applications in which it is useful to rapidly determine whether or not an item exists in a stored file. In some situations, the existence of the item is known, but the location may be unknown. In other situations, it may be unknown whether or not the item exists.

Several search techniques exist in the prior art for determining whether a particular record is stored in a master file, and obtaining the address of location where the record is stored. For example, the master file may be traversed in its entirety, or it may be sorted, or a binary tree search may be performed. Such techniques are time-consuming, and may involve excessive overhead in maintaining master file.

One known technique for reducing search time is hashing, as described in D. Knuth, *The Art of Computer Programming*, vol. 3, Addison-Wesley: 1973. Referring now to FIG. 2, there is shown a block diagram of a hash table architecture according to the prior art. Master file 205, which is typically stored in a data storage device such as a hard drive or other long-term storage, contains a number of data records 223, 224, 225, 226, 227, 228. Records 223, 224, 225, 226, 227, 228 contain any type of information that may be retrieved for use by a user or by a computer system. Each record 223, 224, 225, 226, 227, 228 is stored at a particular location having a specific address, so that a record may be retrieved from master file 205 in a conventional manner by reference to the address of the record. Any number of records 223, 224, 225, 226, 227, 228 may be included in master file 205.

Hash table 204 is constructed and stored, for example in data storage such as a hard drive or other storage device. Hash table 204 can be of arbitrary size, and contains some number of hash buckets 211, 212, 213, each bucket containing some number of entries. Each entry contains a fixed-length, for example 32-bit, pointer 217, 218, 219, 220, 221, 222 to an address indicating a particular location in master file 205. In the example of FIG. 2, pointer 219 points to the address of a location in master file 205 containing record 225, while pointer 220 points to the address of a location in master file 205 containing record 227.

Any number of hash buckets 211, 212, 213 may be provided in hash table 204, and any number of entries, or pointers 217, 218, 219, 220, 221, 222 can be provided in each hash bucket 211, 212, 213. For example, 65,536 buckets 211, 212, 213 may be included, each bucket containing up to 32 entries.

Each hash bucket 211, 212, 213 is associated with a hash key 214, 215, 216 that can be obtained by applying hash function 202 to an item to be stored or retrieved. Hash function 202 may be any operation that can be performed on the item, and preferably is an operation that results in a relatively even distribution of items among buckets 211, 212, 213 in hash table 204. For example, one such hash function 202 involves performing successive exclusive-OR operations on the characters forming the character string of the item. This results in an 16-bit hash key that is capable of uniquely identifying 216, or 65,536 different hash buckets 211, 212, 213.

When a new record containing an item is added to master file 205, a pointer to the record is added to hash table 204. The pointer is added to the appropriate hash bucket, determined by applying hash function 202 to the value of the new item. The new pointer in the hash bucket contains an address indicating the location in master file 205 of the new item.

In order to determine whether a particular item exists in master file 205, a search term 201 is supplied containing a text string or other identifier for the desired record. In the example of FIG. 2, search term 201 indicates the data represented by record 227. Hash function 202 is applied to search term 201 in order to obtain hash key 203. Hash bucket 212 containing the identical key 215 to the obtained hash key 203 is identified.

Bucket 212 is then traversed. For each item in bucket 212, the referenced location in master file 205 is consulted and the stored item is compared to search term 201. If a match is found, the traversal ends and a positive result is returned. If the location of the item is desired, it may also be returned. If all items in bucket 212 are checked without finding a match, a negative result is returned.

Thus, in the example of FIG. 2, pointer 219 is dereferenced and the corresponding record 225 in master file 205 is consulted. Record 225 is compared with search term 201, and no match is found. Pointer 220 is then dereferenced and the corresponding record 227 in master file 205 is consulted. Record 227 is compared with search term 201, and a match is found. A positive result is returned, along with the address of record 227 or the data contained therein, as desired.

The prior art technique of FIG. 2 for identifying the existence and location of an item in a file is relatively slow because it requires a relatively large number of reads from hash table 204 and from master file 205. For a worst-case positive result, all pointers in the identified bucket must be dereferenced and compared with search term 201 before a match is found. For an average positive result, half of the pointers in the identified bucket must be dereferenced and compared. Therefore, on average, a positive result requires one read from hash table 204, plus N/2 reads from master file 205, where N is the average number of entries in each hash bucket of hash table 204. For a negative result, all pointers in the bucket must be consulted in order to rule out a match, so that a negative result requires an average of 1+N reads. The large number of reads required to implement a conventional hash table for determining the existence of an item severely impacts the performance of a system employing this technique.

In addition, the above-described technique does not allow for optimized or improved performance in certain special cases, such as where the existence of an item is known but not its location. Whether or not such existence is known, the same traversal operations must be performed as described above.

What is needed is a system and method for determining the existence of an item in a file in a rapid and efficient manner. In addition, what is needed is a system and method for determining the location of an item in a file in a rapid and efficient manner, and which is capable of being optimized for improved performance in special cases.

SUMMARY OF THE INVENTION

The present invention provides a system and method of identifying the existence and location of an item in a file in a rapid and efficient manner. The present invention minimizes the number of reads that are performed when identifying such information. In addition, the present invention is capable of being optimized for improved performance in special cases, such as when the existence of an item is known and its location is sought.

A hash table is constructed of arbitrary size, containing some number of buckets, each bucket containing some number of entries. Each entry contains two portions, including a first portion containing a pointer to a specific location in a master file containing stored items, and a second portion containing a value of a secondary hash function, as will be described below. This secondary hash function is employed to rapidly determine whether an item exists in the file and identifying the location of the item without requiring an undue number of reads from the master file.

When an item is added to the master file, a pointer to the item is added to the hash table, as follows. A primary hash function is applied to the item to obtain a primary hash key. A particular bucket is identified by the obtained primary hash key, and an entry containing a pointer to the item in the master file is added to the identified bucket.

A secondary hash function is applied to the item to obtain a secondary hash key. The secondary hash function is preferably independent of the primary hash function. The secondary hash key is stored in the hash table as a second portion of the hash table entry.

In order to determine whether a particular item exists in a master file, the primary hash function is applied to the search term to identify a bucket. The secondary hash function is applied to the search term and the determined secondary hash key is compared with the secondary hash keys for the entries stored in the identified bucket. If no match is found, a negative result is obtained. If one or more matches is found, the master file is consulted for each of the matches and the stored item is compared to the search term. The master file need not be consulted for nonmatching items, since it is known that such items do not match the search term. Since the number of matches is generally relatively small compared to the size of the entire bucket, the number of reads from the master file is significantly reduced as compared to the prior art scheme described previously.

Furthermore, in certain special cases the system and method of the present invention may return a location of an item without consulting the master file at all. Specifically, if an item is known to exist in the master file, and its location is sought, and if comparison of the secondary hash key results in a single match in the identified bucket, the single match is known to contain the desired location, and the location may be returned without consulting the master file.

Therefore, the system and method of the present invention substantially reduce the number of reads that are performed in identifying the existence and/or location of an item in a file, and thereby improve efficiency and speed of operations using such identifications.

The system and method of the present invention are capable of application to many different types of operations. One such application is to perform a contextual text search, such as for example the identification of URLs falling within the intersection of a full-text search and a category of a content directory. A full-text search may be performed on a search term, and each result can be checked against a category of a content directory using the hashing techniques of the present invention. In this manner, a rapid determination can be made as to the existence and location of URLs falling within the intersection of the full-text search and the specified category of the content directory.

DETAILED DESCRIPTION OF THE INVENTION

Figure 1:
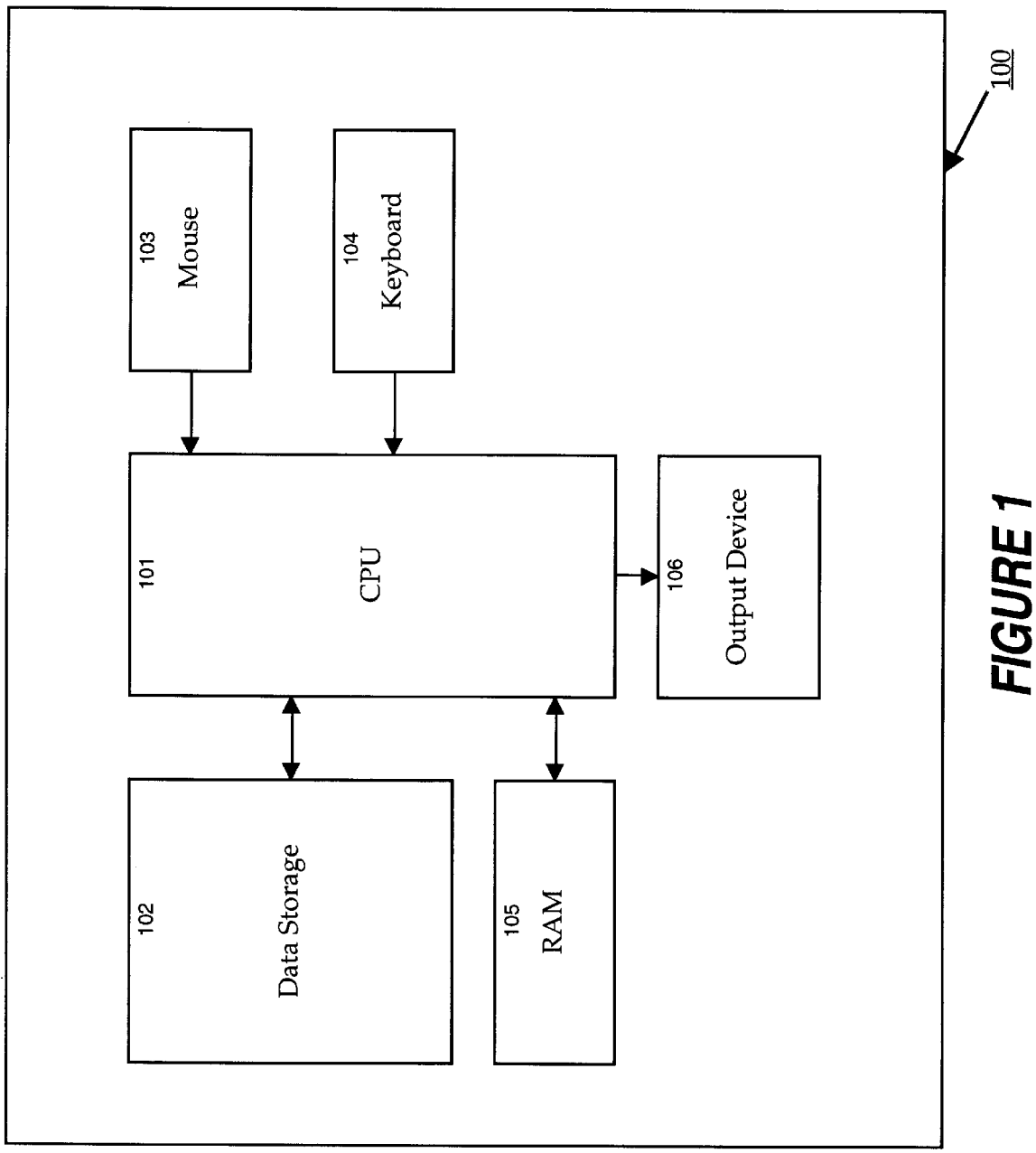
FIG. 1 is a block diagram of a hardware architecture for practicing the present invention.
Figure 2:
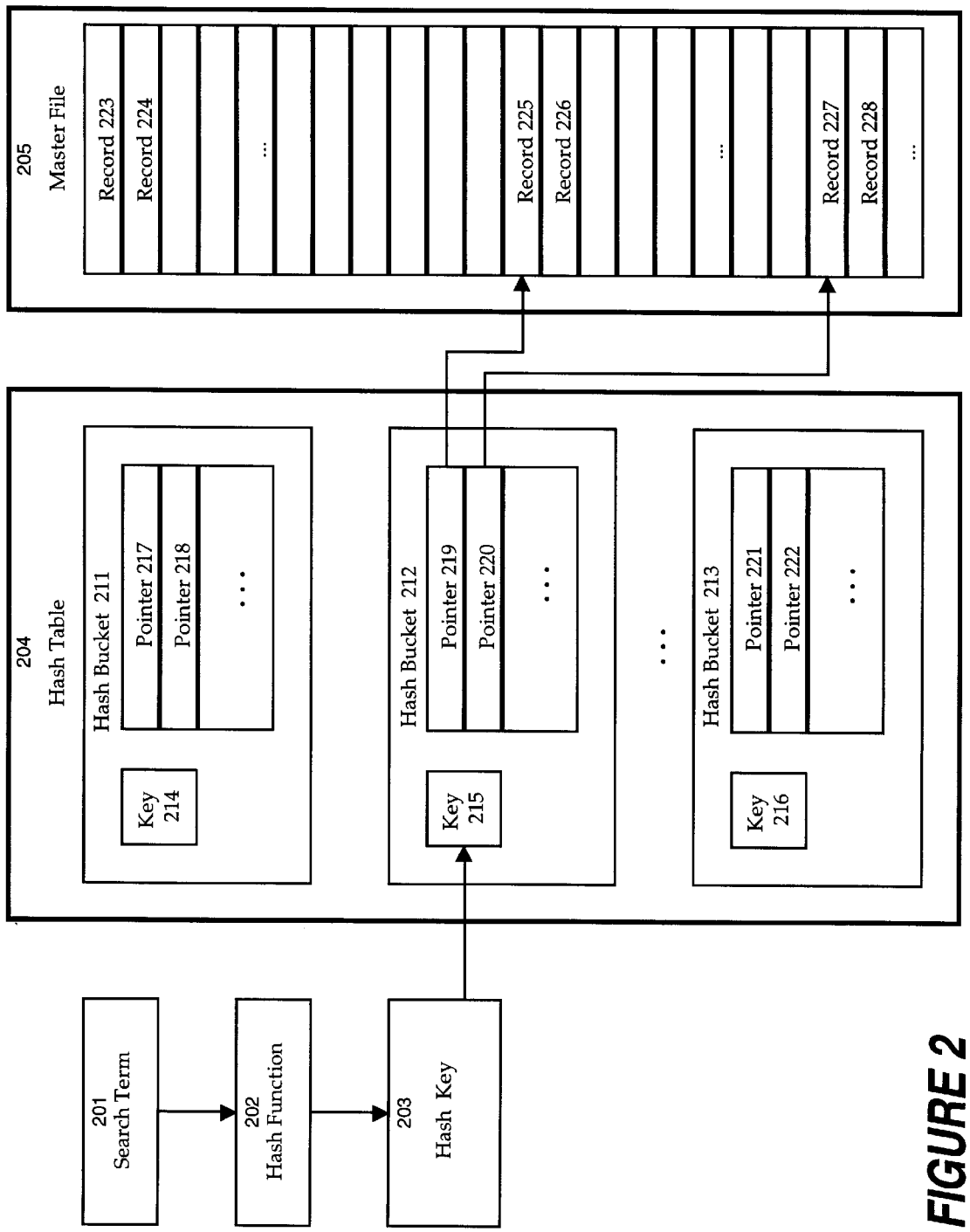
FIG. 2 is block diagram of a hash table architecture according to the prior art.

Referring now to FIG. 1, there is shown a block diagram of a hardware configuration for practicing the present invention. In one embodiment, the present invention is implemented as software running on a conventional personal computer such as an Apple® Macintosh® computer. Thus, the hardware architecture of system 100 as shown in FIG. 1 may be implemented as a combination of components of such a computer, though other implementations may also be used. Central processing unit (CPU) 101 executes software instructions and interacts with other components to perform the techniques of the present invention. Random-access memory (RAM) 105 stores software instructions to be executed by CPU 101, and may store other data to act as a workspace in the implementation of the present invention, including for example, representations of search terms and hash keys. Data storage 102 provides long-term storage of software programs and data, including a hash table and master data file as will be explained in more detail below. In one embodiment, data storage 102 is a hard disk drive, but other embodiments may use other data storage devices. Input devices such as mouse 103 and keyboard 104 facilitate user control of the operation of system 100, including specification of search parameters and keys. Output device 106, such as a display screen or printer, provides search results and other information resulting from the operation of system 100. In one embodiment, system 100 also includes a communications device (not shown) such as, for example, a modem for connection to a computer network such as the Internet. Search parameters and keys may thereby be provided over the network connection, for example when system 100 is used for implementation of on-line searches on the World Wide Web.

Figure 3:
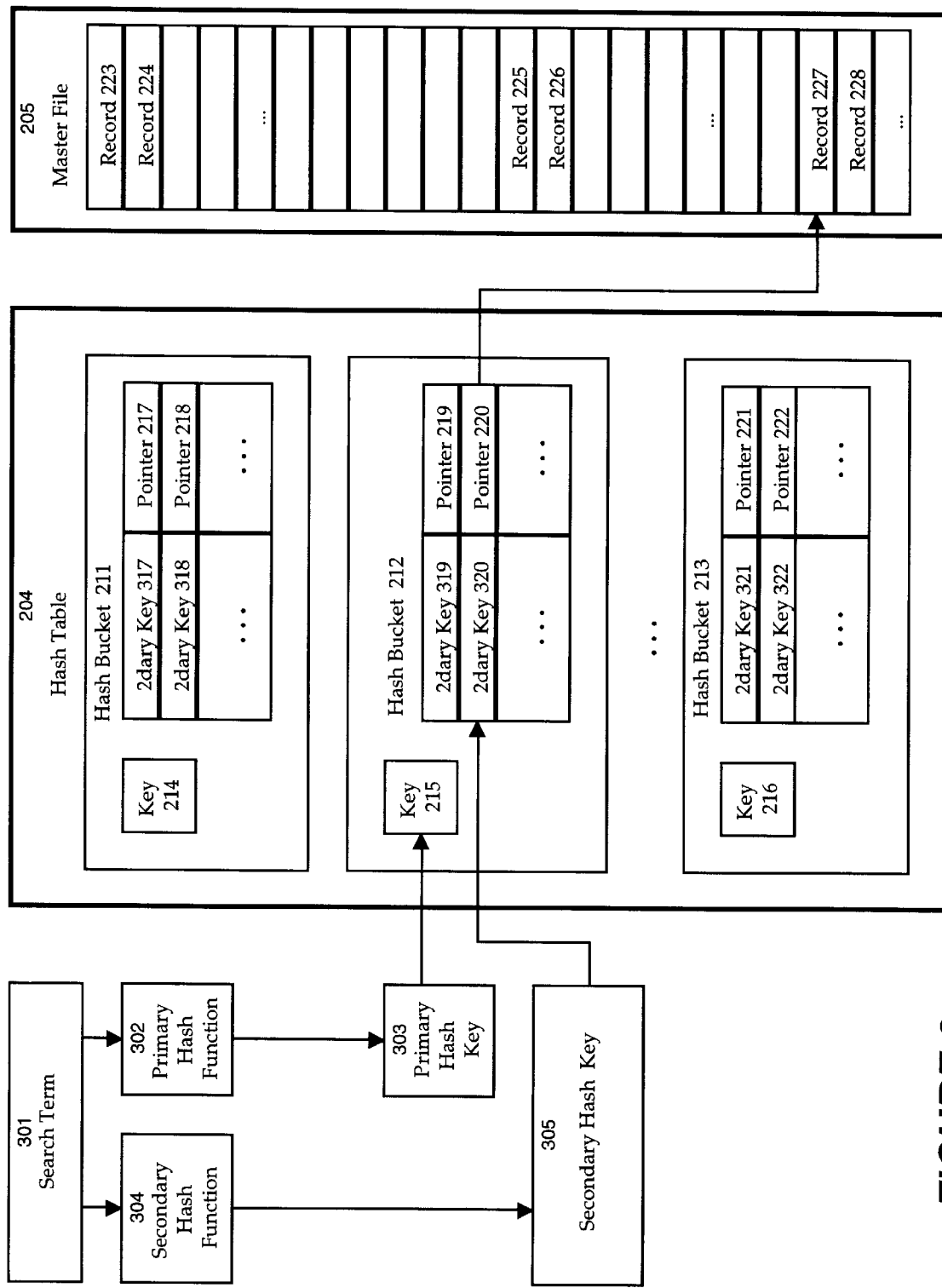
FIG. 3 is block diagram of an improved hash table architecture according to the present invention.

Referring now to FIG. 3, there is shown an improved hash table architecture according to the present invention. As described above in connection with the prior art, hash table 204 is constructed and stored, for example in data storage such as a hard drive or other storage device 102. Hash table 204 can be of arbitrary size, and contains some number of hash buckets 211, 212, 213, each bucket containing some number of entries. For example, $2^{16}$, or 65,536 buckets may be included, each bucket containing up to 32 entries. Each entry contains two portions: 1) a fixed-length, for example 32-bit, pointer 217, 218, 219, 220, 221, 222 to an address indicating a particular location in master file 205; and 2) a secondary key 317, 318, 319, 320, 321, 322 of some length, for example 32 bits, representing the value of a secondary hash function 304 applied to the item referenced by the entry. In the example of FIG. 3, pointer 220 points to the address of a location in master file 205 containing record 227, and secondary key 320 represents the value of secondary hash function 304 applied to the contents of record 227. Thus, in one embodiment, each entry in the hash table may contain 64 bits, including 32 bits for storage of a pointer to the master file and 32 bits for storage of a secondary hash key.

In an alternative embodiment, each entry contains an item containing actual data, rather than a pointer, so that the information stored by the system is contained in the hash table entries themselves rather than in a separate master file 205. Such an arrangement is simpler than the architecture involving a separate master file, and may be advantageous, for example, when the space required to store each item is relatively small.

Any number of hash buckets 211, 212, 213 may be provided in hash table 204, and any number of entries, or pointers 217, 218, 219, 220, 221, 222 can be provided in each hash bucket 211, 212, 213. For example, 65,536 buckets 211, 212, 213 may be included, each bucket containing up to 32 entries.

Each hash bucket 211, 212, 213 is associated with a primary hash key 214, 215, 216 that can be obtained by applying primary hash function 302 to the item to be stored. Primary hash function 302 may be any operation that can be performed on the item, and preferably is an operation that results in a relatively even distribution of items among buckets 211, 212, 213 in hash table 204. For example, one such primary hash function 302 involves performing successive exclusive-OR operations on the characters forming the character string of the item. This results in a 16-bit hash key that is capable of uniquely identifying $2^{16}$, or 65,536 different hash buckets 211, 212, 213.

Each entry in hash table 204 also contains a secondary hash key 317, 318, 319, 320, 321, 322 that can be obtained by applying a secondary hash function 304 to the item to be stored. The secondary hash function 304 may be any operation that can be performed on the item, and is preferably independent from the primary hash function 302. For example, one such secondary hash function 304 for application to URLs produces a 32-bit secondary hash key as follows:

2 bits representing domain:
  00="com";
  01="edu";
  10="gov";
  11=other;
3 bits representing URL depth (number of slashes);
1 bit representing file extension:
  0=".html";
  1=".mcf";
6 bits representing the number of bytes in the URL;
20 bits representing coded URL content, determined by selecting five characters from the URL, forming a four-bit representation for each selected character, and concatenating the representations into a 20-bit string. The five characters are selected as follows: two characters immediately following the last slash in the URL; two characters immediately following the second-last slash in the URL; and one character immediately following the third-last slash in the URL. The four-bit representations are formed using some encoding scheme, such as a=1, b=2, c=3, ... n=14, o=15, any other =0.

The above-described secondary hash function 304 is merely exemplary; any such function 304 may be employed.

As will be described in more detail below, when a new record containing an item is added to master file 205, a pointer to the record is added to hash table 204. The pointer is added to the appropriate hash bucket, determined by applying primary hash function 302 to the value of the new item. The new pointer in the hash bucket contains an address indicating the location in master file 205 of the new item. Secondary hash function 304 is applied to the item, and the result is stored along with the pointer in the appropriate hash bucket determined by primary hash function 302.

In order to determine whether a particular item exists in master file 205, a search term 301 is supplied containing a text string or other identifier for the desired record. In the example of FIG. 3, search term 301 indicates the data represented by record 227. Primary hash function 302 is applied to search term 301 in order to obtain primary hash key 303. Hash bucket 212 containing the identical key 215 to the obtained primary hash key 303 is identified.

Secondary hash function 304 is applied to search term 301 to obtain secondary hash key 305. Secondary hash key 305 is compared with secondary keys 319, 320 for the entries in bucket 212. Possible matches can thus be identified without dereferencing pointers 219, 220 and without consulting master file 205. If no matches are found, a negative result is obtained without requiring any reads of master file 205. If one or more matches is found, pointer 220 corresponding to the match is dereferenced and master file 205 is consulted to determine whether record 227 matches search term 301. Since the number of matches is generally relatively small compared to the size of the entire bucket, the number of reads from the master file is significantly reduced as compared to the prior art scheme described previously. In one embodiment, reads of secondary keys in hash entries are generally less expensive than reads of records in master file 205, since the hash entries are smaller in size, and are often located in a contiguous area of memory.

In addition, in certain special cases a positive result can be returned and the address of the match can be provided without consulting master file 205. For example, if an item matching the supplied search term 301 is known to exist somewhere in master file 205, and its location is sought, and if comparison of secondary hash key 305 results in a single matching entry in the identified bucket 212 of hash table 204, the single matching entry must contain the desired location. Thus, pointer 220 may be returned as the location of matching record 227 without first consulting master file 205.

If more than one matching entry is found, the system of the present invention may supply pointers for all matching entries, or it may consult master file 205 for the matching entries in order to perform comparisons with search term 301 to identify the correct record in master file 205.

Figure 4:
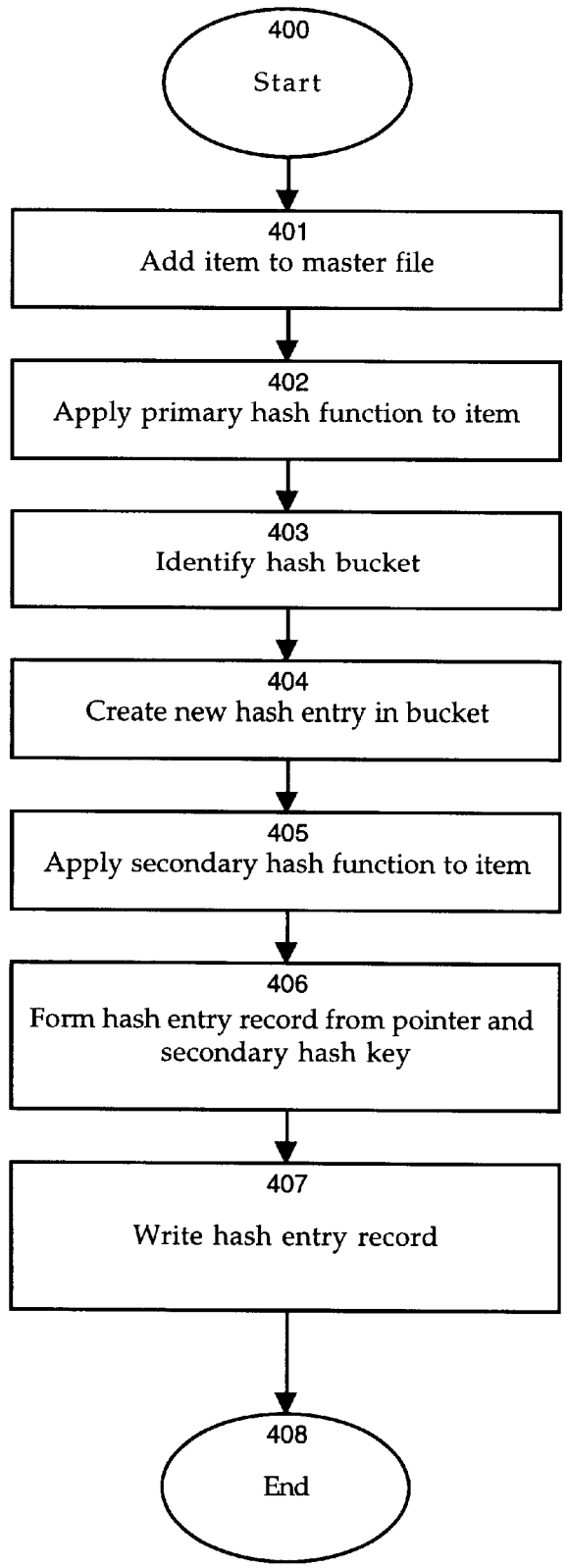
FIG. 4 is a flowchart of a method of adding an item to a file according to the present invention.

The hash table architecture of FIG. 3 is maintained by adding an entry to hash table 204, including a pointer and a secondary key, whenever a new record is added to master file 205. Referring now also to FIG. 4, there is shown a flowchart of a method of adding an item according to the present invention. The item is added 401 as a record onto an existing master file 205. Master file 205 may be constructed as a flat-file database, linked list, or any other data structure, and the operation of adding 401 a record is performed as appropriate for the particular data structure. Primary hash function 302 is applied 402 to the new item to obtain primary hash key 303. As described above, in one embodiment primary hash function 302 is an exclusive-OR operation performed on each successive character in the new item. A hash bucket is identified 403 based on the resulting key 303, and a new hash entry is created 404 in the identified bucket. Secondary hash function 304 is applied 405 to the new item to obtain secondary hash key 305. A hash entry record is formed 406 by combining secondary hash key 305 with a pointer to the record of the item in master file 205. The hash entry record is written 407 to the new hash entry in the identified bucket.

Figure 5:
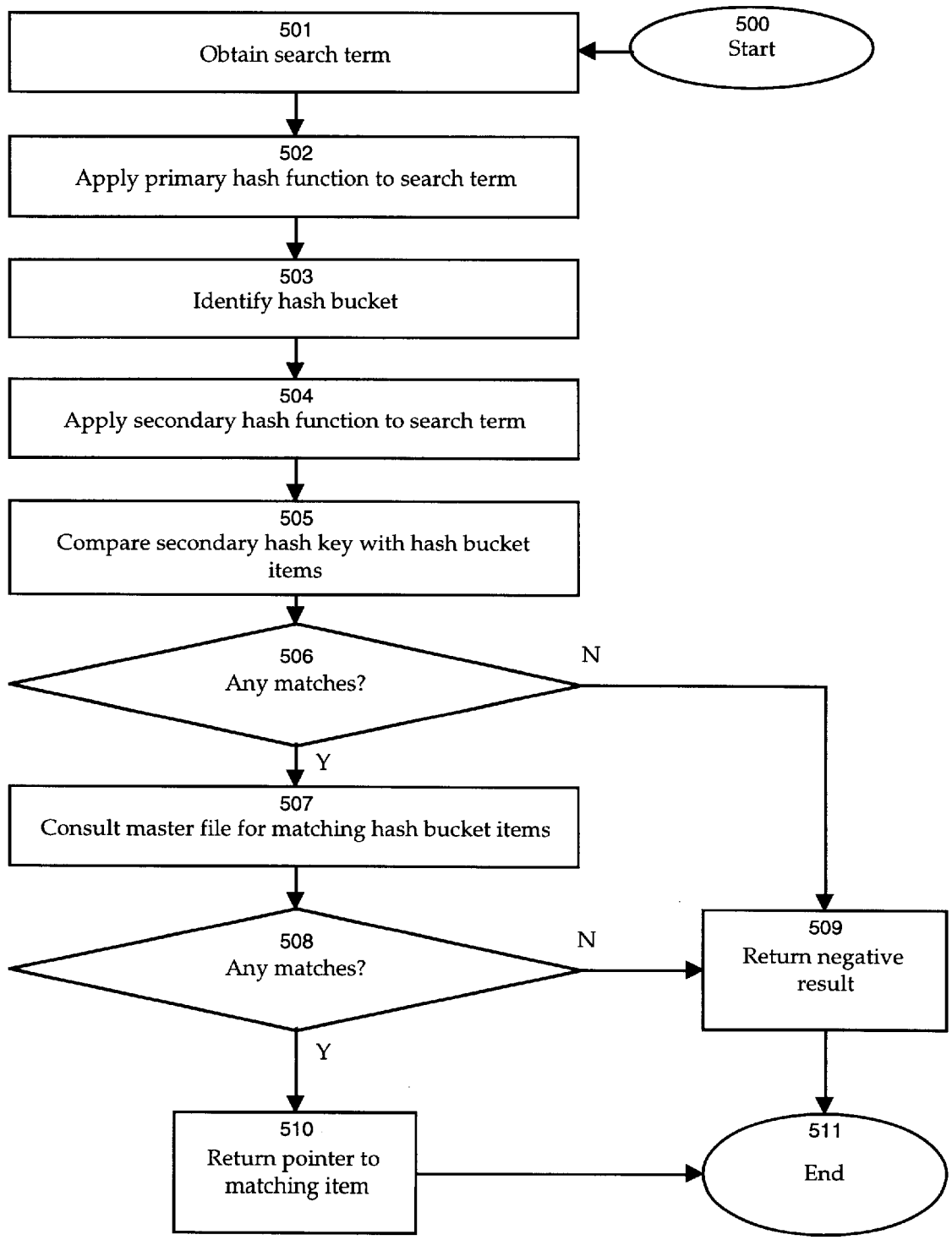
FIG. 5 is a flowchart of a method of identifying the existence of an item in a file according to the present invention.

Referring now also to FIG. 5, there is shown a flowchart of a method of identifying the existence of an item in a file according to the present invention. Search term 301 is obtained 501 based on input from a user, or from some other source. Primary hash function 302 is applied 502 to search term 301 to obtain primary hash key 303. A hash bucket is identified 503 by the obtained primary hash key 303. Secondary hash function 304 is applied 504 to search term 301 to obtain secondary hash key 305. Secondary hash key 305 is compared 505 with secondary keys for items in the identified hash bucket. If any matches are found 506, pointers in the matching records are dereferenced and the appropriate records in master file 205 are consulted 507 to determine whether any of them are true matches for search term 301. If any matches are found 508, a positive result along with the pointer to the matching item or items is returned 510. In an alternative embodiment, the record value of the matching item or items is returned. If in 508 no match is found, or if in 506 no match is found, a negative result is returned 509.

As described previously, in one embodiment, if a particular record is known to exist in master file 205 and its location is sought, step 507 may be omitted if exactly one match is found in 506. A positive result, along with a pointer to the matching item, may be returned 510 without consulting master file 205. In alternative embodiments, other special cases may exists wherein a match may be returned without consulting master file 205.

Figure 6:
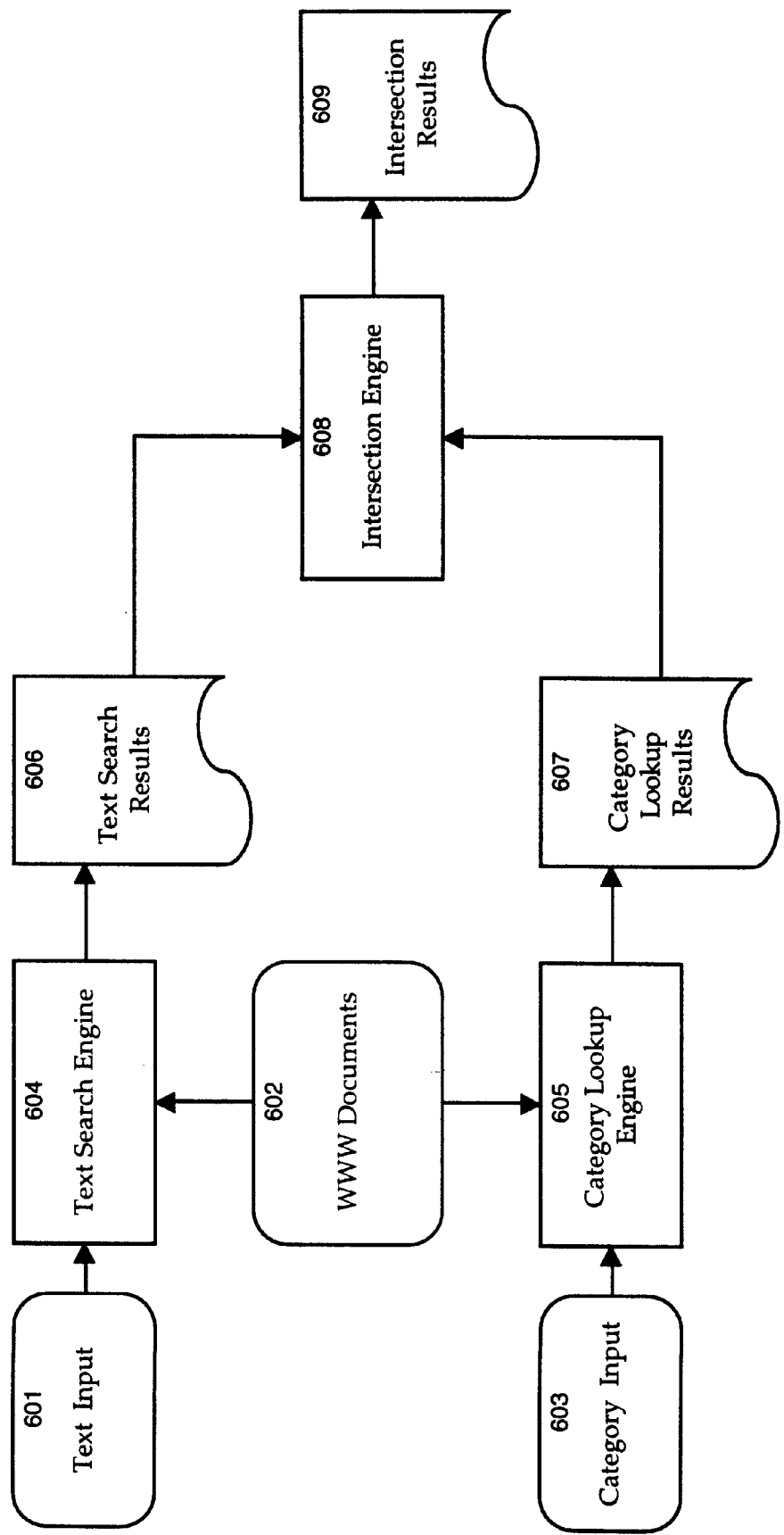
FIG. 6 is a block diagram of a system of contextual text searching according to the present invention.

Referring now to FIG. 6, there is shown a block diagram of a system of contextual text searching according to the present invention that may be implemented using the improved hash table techniques described above. The system of FIG. 6 is an example of an application of the above-described techniques to a context-based textual search of a document space such as, for example, the World Wide Web.

The user provides text input 601, such as a text string for processing by text search engine 604. Text search engine 604 performs a conventional automated search through the set of documents 602, which may include World Wide Web documents or any other collection of documents. Text search engine 604 generates text search results 606 based on its findings in documents 602. For example, if text input 601 is the word "lion", text search results 606 includes URLs for all documents in document set 602 containing the text string "lion". As described previously, results 606 may include documents that contain the specified string but are unrelated to the intended object of the search. In an alternative embodiment, any type of search criteria may be provided in place of or in addition to text input 601, such as date of document creation, author identification, and the like.

The user also provides category input 603 specifying a subject category for the search. Category lookup engine 605 determines which documents in document set 602 fall within the specified category, and generates category lookup results 607. For example, if category input 603 is the category "science/biology/zoology/mammals", results 607 include all documents falling within that category.

Intersection engine 608 determines which documents from document set 602 appear in both text search results 606 and category lookup results 607, thus forming the intersection results 609. In order to produce intersection results 609, intersection engine 608 checks each item in text search result to determine whether it exists in the specified category as described by category lookup results 607. Intersection results 609 therefore contains a list of URLs for documents that contain the desired text term and have been categorized in a desired category, so that such documents are more likely to be useful to the user. In one embodiment, intersection engine 608 employs an improved hash table technique as described above in identifying the existence of each item of text search results 606 in category lookup results 607.

The system depicted in FIG. 6 is merely one example of an application of the improved hash table technique of the present invention. As will be apparent to those skilled in the art, many other applications of the improved hash table technique of the present invention may be implemented without departing from the spirit or essential characteristics of the present invention.

Thus, the above-described invention provides an improved system and method for rapidly identifying the existence and location of an item in a file by reducing the number of reads required in order to identify a match or the absence of a match. The above description provides merely exemplary embodiments for practicing the present invention. Those skilled in the art will recognize that other embodiments are possible without departing from the spirit or essential elements of the invention claimed herein.

What is claimed is:

1. A system for rapidly identifying the existence of an item in a file, comprising:
    a master file for storing a plurality of items; and
    a hash table, comprising a plurality of hash buckets, each hash bucket identified by a primary hash key, each hash bucket comprising at least one hash entry, each hash entry comprising:
        a pointer to an item in the master file, for identifying the location of the item; and
        a secondary hash key obtained by applying a secondary hash function.

2. The system of claim 1, further comprising:
    a search term input device for obtaining a search term;
    a primary hash function application module coupled to the search term input device, for applying a primary hash function to obtain a primary hash key for the search term;
    a secondary hash function application module coupled to the search term input device, for applying the secondary hash function to obtain a secondary hash key for the search term; and
    a hash key comparison module coupled to the hash table, for comparing the secondary hash key for the search term with at least one secondary hash key for a hash entry in an identified hash bucket;
    wherein the identified hash bucket is identified by a primary hash key matching the obtained primary hash key for the search term.

3. The system of claim 2, wherein the search term comprises a plurality of characters, and the primary hash function application module applies a primary hash function by performing successive exclusive-OR operations on successive characters of the search term.

4. The system of claim 2, wherein the search term comprises a plurality of segments, and the secondary hash function application module applies a secondary hash function by encoding each of at least one of the plurality of segments according to a predetermined encoding scheme.

5. The system of claim 2, further comprising:
    an item comparison module, coupled to the master file and to the hash table, for, responsive to the hash key comparison module indicating at least one hash entry having a matching secondary hash key, comparing the search term with an item in the master file identified by the pointer in the hash entry.

6. The system of claim 5, further comprising:
    an output device coupled to the item comparison module, for out-putting the results of the item comparison performed by the item comparison module.

7. The system of claim 6, wherein, responsive to the results of the item comparison indicating a match, the output device outputs the location of the matching item in the master file.

8. The system of claim 2, further comprising:
    an output device coupled to the hash key comparison module, for outputting the results of the hash key comparison performed by the hash key comparison module.

9. The system of claim 8, wherein the output device, responsive to the results of the hash key comparison indicating a match, outputs the location of the matching item in the master file.

10. The system of claim 1, wherein:
    the master file is implemented as a database in a computer system; and
    the hash table is implemented as a database in a computer system.

11. The system of claim 1, wherein:
    the master file stores a plurality of descriptors, each descriptor representing a document associated with a particular subject category; and
    the item represents a result of a text search.

12. A method of identifying the existence of an item in a file, comprising:
    a) applying a primary hash function to obtain a primary hash key for a search term;
    b) identifying a hash bucket having a primary hash key corresponding to the obtained primary hash key, the hash bucket comprising at least one hash entry, each hash entry comprising a value and a secondary hash key;
    c) applying a secondary hash function to obtain a secondary hash key for the search term; and
    d) comparing the secondary hash key for the search term with the secondary hash key for at least one hash entry in the identified hash bucket.

13. The method of claim 12, further comprising:
    e) outputting the results of d).

14. The method of claim 12, wherein the value in each hash entry represents a pointer to a record location in a master file, the method further comprising:
    e) responsive to d) indicating at least one match, retrieving a record in the master file having a location corresponding to the value in the matching hash entry; and
    f) comparing the search term with the retrieved record.

15. The method of claim 14, further comprising:
    g) responsive to f) indicating a match, outputting the pointer for the matching record.

16. The method of claim 14, further comprising:
    g) responsive to f) indicating a match, outputting the matching record.

* * * * *